Dec. 20, 1966     R. E. CHURCH     3,293,463
LEAD POSITIONER AND ANCHOR FOR DYNAMOELECTRIC MACHINES
Filed Dec. 2, 1963
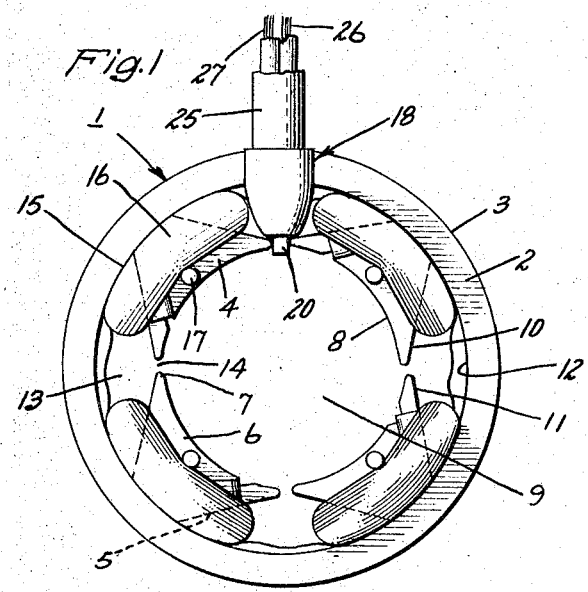
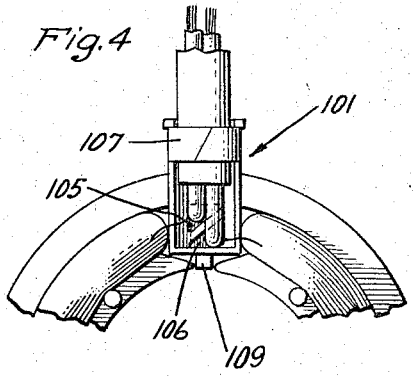
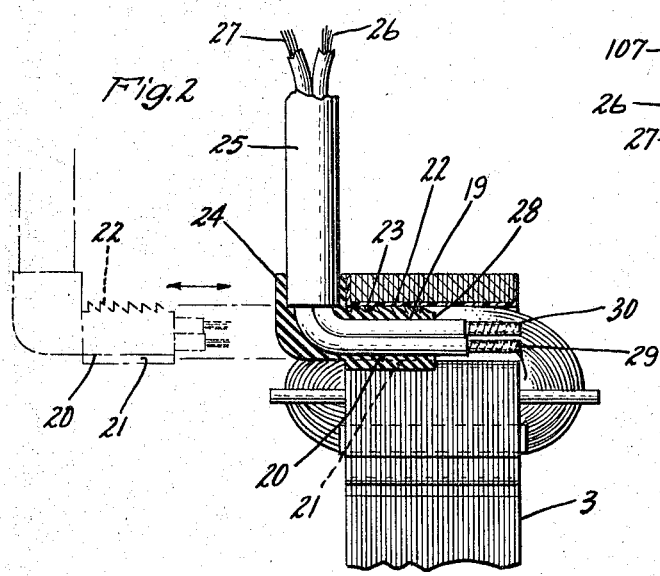
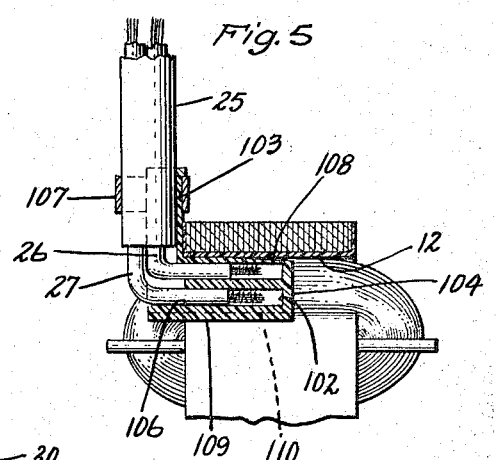
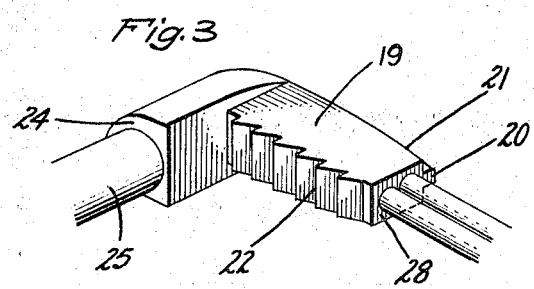
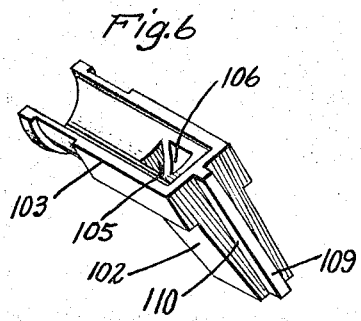
INVENTOR.
Ralph E. Church,
BY Edward J. Hanson
Attorney.

United States Patent Office 3,293,463
Patented Dec. 20, 1966

3,293,463
LEAD POSITIONER AND ANCHOR FOR DYNAMOELECTRIC MACHINES
Ralph E. Church, Fort Wayne, Ind., assignor to General Electric Company, a corporation of New York
Filed Dec. 2, 1963, Ser. No. 327,453
11 Claims. (Cl. 310—71)

My invention relates to lead positioners and anchors and more particularly to lead positioners and anchors for use in the stators of dynamoelectric machines.

In certain applications, it is desirable, if not necessary, that the power source leads attached to the stator winding of a dynamoelectric machine be both positioned and anchored to the stator. This positioning and anchoring is done to prevent the shorting or grounding of the leads and the ends of the winding where they connect. In many cases if a secure anchoring of the power leads is not achieved they will actually be broken wholly away from the stator. Not only does the shorting, grounding or breaking away of the leads interrupt the operation of the machine it also presents a safety hazard if the leads are energized.

Accordingly, it is a principal object of my invention to provide a new and improved lead positioning and anchoring device for use in dynamoelectric machines, which locates the lead wires positively in a predetermined position and holds them securely therein.

It is another object of my invention to provide such a positioner and anchor which is of compact size and which is easily assembled and disassembled in a dynamoelectric machine without the use of expensive tools or the necessity of interfering with other parts of the device.

A further object of my invention is to provide an improved lead-in arrangement for salient pole stators of electric motors, wherein the lead positioner and anchor is so dimensioned that it fits into and is held by the slot between adjacent salient poles with no further securing means being required.

Briefly stated, in accordance with my invention I have provided an improved lead wire positioning and anchoring arrangement for use in dynamoelectric machines. In its preferred form my lead wire positioner and anchor is particularly adapted for use in a salient pole stator having a yoke section with a plurality of spaced apart salient poles extending from the yoke section. Each salient pole has a narrow neck portion extending from the yoke and a dimensionally wider portion or polar projection at the inner end of the neck portion. Between them the poles define winding slots and each slot has an inner entrance defined by the corresponding but opposite ends or polar tips of two adjacent poles. The back or bottom of the slots between the poles is closed by the yoke as it joins the poles.

A winding is wound on the stator and a pair of leads from a power source are connected to the two ends of the winding. My improved lead wire positioner and anchor has a body portion which receives and positively holds the aforementioned leads in position on the stator. This body portion is dimensioned to fit or plug into the slot between the two adjacent salient poles and their coils. It tightly engages the outer sides of the two salient poles adjacent the slot entrance and it also engages the yoke in the region opposite the entrance and is frictionally held by this engagement in the stator core. In this preferred form of the invention, the body portion of the lead positioner and anchor also has a guiding flange which is slidably received in the slot entrance and which is tightly held there by the aforementioned polar tips of the adjacent salient poles. The flange thus guides and stabilizes the lead wire positioner and anchor in the stator. There is a body extension at one end of the body. This body extension engages one of the side faces of the yoke to limit the distance the body can enter the slot.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a side elevational view of the stator of an electric motor, including the improved lead wire positioning and anchoring arrangement in one form thereof;

FIG. 2 is a fragmentary side elevational view, partly in section, illustrating the relationship of the leads, the lead positioner and anchor and the stator shown in FIG. 1;

FIG. 3 is an isometric view of the lead positioner and anchor shown in FIGS. 1 and 2;

FIG. 4 is a side elevational fragmentary view of the stator of an electric motor, including a modified form of the improved lead wire positioner and anchor;

FIG. 5 is a fragmentary side elevational view, partly in section, of a stator with the modified form of the lead positioner and anchor illustrating the relationship of the lead, the lead positioner and anchor and the stator; and FIG. 6 is an isometric view of the modified form of the lead positioner and anchor.

Referring now to FIG. 1 of the drawing, for purposes of illustrating my improved embodiment of the present invention, I have shown a stator 1 of the type disclosed and claimed in M. V. De Jean Patent 3,030,528 which is assigned to the same assignee as the present invention. The core 2 of the stator is made of a plurality of stacked laminations of magnetic material. The core has a yoke section 3 and a plurality of adjacent teeth 4 with each tooth in the stator core shown in the drawing forming a separate salient pole. Each of the teeth or salient poles 4 has a narrow neck portion 5 projecting inwardly from the yoke section 3 and a dimensionally wider portion or polar projection 6 having ends or polar tips 7 and an arcuate edge or inner surface 8. The arcuate edges 8 define a central bore 9. The outer side walls 10 and 11 of the poles and the inner or bottom wall 12 of the yoke define slots 13. The polar tips 7 define a narrow slot entrance or slot neck 14 opening from each slot into the central bore 9. A winding 15 is wound on the salient poles 4, the winding comprising the coils 16 which may be seen in FIG. 1. The turns of adjacent coils pass through the slot which lies between the adjacent poles on which the coils are wound. Winding pins 17 serve to hold the laminations together and retain the end turns of the coil out of interference with other parts of the motor (not shown).

I have provided an improved stator winding lead positioner and anchor member 18 which may be seen in its preferrred form in FIGS. 1 and 2. The lead positioner and anchor 18 is positioned in the uppermost slot of the stator (as viewed in FIG. 1). The lead positioner and anchor is preferably made of insulating material so that it may be used in either non-insulated or insulated slots.

Referring now to FIG. 2 it can be seen that my improved lead positioner and anchor 18 has a body 19 including a guiding flange 20 which projects from the positioner and anchor's inner face 21. Serrations or ribs 22 may be seen on the positioner and anchor's outer face 23. The lead positioner and anchor has an enlarged section or body extension 24 which extends at substantially a right angle from the left hand end of the body 19. A cable 25 is secured in the body extension 24 and a pair of insulated input lead wires 26 and 27 extend through adjacent bores or passages in the body 19 and project out of the body from the right hand body wall 28.

The lead positioner and anchor in my preferred embodiment is made of the material neoprene, although other suitable insulating materials, for example, hard rubber, could be used. The material of the lead positioner and anchor 18 is chosen so that an excellent frictional engagement occurs between the lead wire positioner and anchor and the abutting portions of the core 2 when the anchor is plugged into the stator. The ribs 22 on the body 19 of the lead positioner and anchor may be seen in FIGS. 2 and 3 to be saw toothed ribs with the points of the ribs slanting toward the body extension 24 of lead positioner anchor. These teeth frictionally engage the inner wall 12 of the stator yoke section 3. The slant of the ribs 22 results in an increased engagement of the wall 12 when the extraction of a lead positioner and anchor is attempted from a slot 13 as compared to insertion of a lead positioner and anchor in a slot 13.

The leads are secured in the lead positioner and anchor by the fusion of and by the molded fit of the neoprene material about the insulation of the cable 25 in the body extension 24 and about the insulation of the leads 26 and 27 in the body 19. The bending of the leads 26 and 27 from their direction of entry into the body extension 24 down into the body portion 19 of the lead positioner and anchor 18 also helps to secure them in the anchor against forces which would separate them from the anchor.

The positioner and anchor is guided into position between spaced apart coil sides of the winding 15 located in the same slot 13 by inserting the positioner and anchor into slot 13 with guiding flange 20 being received in the narrow slot entrance 14 and slipping between the pole tips 7 of the poles 4. The inner face 21 of the positioner and anchor engages the outer pole walls 10 and 11 which lie adjacent the entrance 14. The other or outer face 23 of the lead positioner and anchor bears against the inner wall 12 of the stator yoke with the ribs 22 sliding over the wall 12 as the anchor is inserted. The guiding flange 20 both steadies and guides the lead positioner and anchor as it is inserted in the slot 13. The engagement of the sides of the flange 20 with the pole tips 7 in the slot entrance 14 stabilizes the positioner and anchor preventing it from being subsequently canted. This also frictionally aids in the positioner and anchor's retention in the slot. The width of the lead positioner and anchor 18 is carefully chosen so that it will fit between the coils of the winding without disturbing them. Body extension 24 engages the side face of the core 2 as seen in FIG. 2 and limits the distance the body 19 can enter the slot 13.

After the lead positioner and anchor 18 has been seated in position as shown in FIG. 2 a portion of each lead projecting from the right hand wall 28 of the body 19 is stripped of insulation. The two ends of the winding are attached to the respective stripped lead portions and then sleeves 29 and 30 are slipped over the stripped portions and the attached ends of the winding to prevent a shorting of the wires in the region of the connections. The guide flange 20 by preventing the anchor 18 from being canted after it has been inserted in the slot 13 prevents the breaking apart of the connections after they are made. Of course, the frictional retention of the lead positioner and anchor in a secure position in the slot through the frictional engagement of portions of the lead positioner and anchor with adjacent walls of the stator core also serves to protect the connections from being broken apart.

FIGS. 4, 5 and 6 represent a modified form of my invention. Referring to FIGS. 4 and 5 it will be seen that a modified lead positioner and anchor member 101 is positioned in the upper slot 13 of a stator 1 in the same manner and in the same position as the above described lead positioner and anchor 18 is positioned in FIGS. 1 and 2. The anchor 101 includes a body 102 which is disposed in the slot 13 of the stator and an enlarged entrance arm section or body extension 103 which extends transversely to the body. It will be seen that the body extension 103 is open and semi-circular in cross section so that the cable 25 lies on it rather than being wholly encompassed as in the preferred form of my invention. The left hand end of the body 102 of the positioner and anchor 101 is open while the right hand wall 104 is closed. Two separate passages, bores or chambers 105 and 106 are formed in the body 102. The bores are perpendicular to the wall 104 and open outwardly from the body 102. A circle clamp 107 may be seen in FIG. 4 holding the power cable 25 in position on the arm 103.

The leads 26 and 27 of the power cable 25 are engaged with and electrically connected to respective ends of the winding 15, and then the connected ends and leads are positioned in the separate bores. For example, the lead wire 26 from the power cable 25 is shown in FIG. 4 secured to one end of the winding and inserted with it into bore 105. The connected end of the lead 26 and the end of the winding project a substantial distance into the bore in side by side relationship at their connected ends. Lead wire 27 is connected to the other end of the winding and the connected wires are positioned in the bore 106 in the same manner.

It will be noted that the leads 26 and 27 extend out of the cable 25 and project into the bores at a substantially right angle to arm 103 and the cable. The leads are stiff and they are held in the bore by their own rigidity resisting their doubling back on themselves and also by their frictional engagement with the walls of bores. It is important that the leads extend a substantial distance into the bores so that they will be held therein without additional means being required.

The modified form of my lead wire positioner and anchor is preferably of substantially rigid construction, although this is not essential. For example, I have molded my modified lead positioner and anchor using the Lexan plastic which is available from General Electric Company. The outer face 108 has a very slight slope to decrease the body thickness at the bottom tip to aid in the insertion of the lead wire positioner and anchor in the slot 13. It will be understood that saw toothed ribs can be formed on the outer face 108 of the lead positioner and anchor 101, if desired similarly to the ribs 22 on lead positioner and anchor 18. A flange 109 is provided on the inner face 110 in my modified lead wire positioner and anchor and serves the same guiding and positioning function as the flange 20 in my preferred embodiment. Flange 109 is received in the stator 1 in the same manner as flange 20, being slipped between the tips 7 of the poles 3. The inner face 110 of the modified form of my lead wire positioner and anchor, of course, engages the pole surfaces in the same manner as the inner face 21 of the preferred embodiment.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A stator for a dynamoelectric machine comprising a core having a yoke section and a plurality of salient poles extending from said yoke section and defining winding slots therebetween, the inner surfaces of said poles defining a rotor receiving bore, each salient pole having a narrow portion extending from said yoke and a dimensionally wider portion adjacent said bore, and at least one of said slots having an entrance defined by the corresponding but opposite polar tips of adjacent poles, a winding on said core including coils wound on said salient poles and extending through said slots, a plurality of input leads connected to said winding, and a lead wire positioner and anchor comprising a body portion for receiving and holding said leads in position on said stator, said body portion fitting into said one slot between the coils accommodated therein and tightly engaging said yoke and the salient poles defining said slot, whereby said anchor is held in said one slot.

2. A stator for a dynamoelectric machine comprising a core having a yoke section and a plurality of teeth extending from said yoke section and defining winding slots therebetween, a winding on said core including coils wound on said teeth, with coil sides extending through said slots, a plurality of input leads connected to said winding, and a lead wire positioner and anchor member having a body portion for positioning and anchoring said leads in position on said stator, said body portion having passage means accommodating a part of the input leads fitted into one of said slots between the coil sides accommodated therein to position said part of the leads within said one slot in spaced relation with the coil sides, whereby said member is maintained in said one slot as it positions the input leads relative to the core.

3. In a stator for a dynamoelectric machine, a core having a yoke section and plurality of slots having wall portions at said yoke section, an energizing winding accommodated by at least some of said slots, a plurality of wire conductors for energizing the coils of said winding, and a wire positioner and anchor having a body for positioning and anchoring at least one of said wire conductors in position on said stator, said body being positioned in one of said slots with at least one of the faces of said body tightly engaged with one of said slot walls thereby to frictionally hold said lead wire positioner and anchor in position in said slot against extraction, and said body including passage means in said one slot accommodating a part of said wire conductors and electrically isolating said wire conductor part from walls of said one slot.

4. The combination of claim 3 wherein said one slot includes wall portions forming a narrow entrance in generally spaced relation to said yoke section and said body includes a guiding flange, said guiding flange projecting from one of the faces of said body and being slidably received in said narrow entrance for guiding and stabilizing said lead anchor and positioner.

5. The combination of claim 3 wherein said body including an enlarged extension at one end for limiting the distance the body can enter the slot, said wire conductors passing into said passage means through said extension.

6. The combination of claim 3 wherein said one slot includes wall portions adjacent a narrow entrance disposed in opposed relation to said yoke section, and said body is in engagement with the slot wall portion at the yoke section as well as with the wall portions adjacent the narrow entrance whereby the wire positioner and anchor is firmly held in the slot.

7. In a stator for a dynamoelectric machine, a core having a plurality of slots and an energizing winding accommodated by at least some of said slots, a plurality of wire conductors for energizing the coils of said winding, and a wire positioner and anchor having a body for positioning and anchoring at least one of said wire conductors in position on said stator, said body being positioned in one of said slots with at least one of the faces of said body tightly engaged with one of said slot walls thereby to frictionally hold said lead wire positioner and anchor in position in said slot against extraction, said one slot including a narrow entrance at one side thereof and said body including a guiding flange, said guiding flange projecting from one of the faces of said body and being slidably received in said narrow entrance for guiding and stabilizing said lead anchor and positioner, and said body having an enlarged section at one end thereof for limiting the distance said body can enter said slot, said body further having a bore entering from said enlarged section and terminating within said body, said bore being dimensioned to receive and retain a power lead wire and a winding wire at their connection with both wires side by side and projecting down into said bore.

8. A lead wire positioner and anchor for receipt in a slot having a neck portion with a wall adjacent each side of the neck portion and a wall opposite the neck portion and its two adjacent walls, said lead wire positioner and anchor comprising at least one lead wire, a body disposed around said lead wire adjacent the end thereof, said body being dimensioned to be received in the slot and to have one body face tightly engaged against the two adjacent walls and another face tightly engaged against the slot wall opposite the slot neck to frictionally hold said lead wire positioner and anchor against extraction from the slot after its insertion, a guide flange projecting from said one face and dimensioned to be slidably received in the neck of the slot for guiding and stabilizing said lead anchor and positioner, and a body extension at one end of said body, said body extension being so dimensioned that it cannot enter the slot and thereby limits the distance said body can enter the slot, said lead wire passing into said one end of said body through said body extension, and extending through said body and out the other end of said body, said body and said lead wire being engaged to prevent the movement of the portion of said lead wire passing through said body relative to said body.

9. A lead wire positioner and anchor for receipt in a slot having a neck portion with a wall adjacent each side of the neck portion and a wall opposite the neck portion, said lead wire positioner and anchor comprising a body dimensioned to be received in the slot, said body having two outer faces on opposite sides of said body, said body and said faces of said body having dimensions that tightly engage one of said faces against the two adjacent walls and the other of said faces against the slot wall opposite the slot neck to frictionally hold said lead wire positioner and anchor against extraction from the slot after its insertion, a guide flange projecting from said one face and dimensioned to be slidably received in the neck of the slot to guide and stabilize said lead anchor and positioner, and a body extension at one end of said body, said body extension being so dimensioned that it cannot enter the slot and thereby limits the distance said body can enter the slot, a bore entering said body from said body extension and terminating within said body, said bore being dimensioned to receive and retain a power lead wire and a winding end wire at their connection with both wires side by side and projecting down into said bore.

10. A stator for use in a dynamoelectric machine, a core comprising a yoke section and a plurality of teeth sections defining a number of coil accommodating slots; a plurality of coils carried by said core including coil sides positioned in said slots, with at least one of said slots accommodating a pair of coil sides in spaced apart relation; a plurality of insulated conductor leads for energizing the coils; means electrically connecting at least two conductor leads in circuit with the coils; and a member including a portion firmly maintained within the space of the one slot between said coil sides; said member portion having passage means receiving an insulated part of at least one of the conductor leads adjacent the means electrically connecting the conductor leads in circuit with the coils.

11. A stator for use in a dynamoelectric machine, a core comprising a yoke section and a plurality of teeth sections defining a number of coil accommodating slots; a plurality of coils formed by a number of wire turns having at least two wire terminations carried by said core including coil sides positioned in said slots, with at least one of said slots accommodating a pair of coil sides in spaced apart relation; at least two conductor leads for energizing the coils electrically connected to the two wire terminations of said coils; and a member having a portion formed of insulating material firmly retained in the one slot between the spaced apart coil sides; said portion having separate passages receiving at least two of said lead conductors and their respective electrical connections with the wire terminations whereby the member positions the conductor leads relative to the core and electrically isolates the individual lead conductor and coil electrical connections.

References Cited by the Examiner
UNITED STATES PATENTS 2,316,635   4/1943   Staak _____ 310—51
2,443,456   6/1948   Herman _____ 310—214

MILTON O. HIRSHFIELD, *Primary Examiner.*

A. J. ROSSI, *Assistant Examiner.*